April 29, 1969 V. F. SEARS ET AL 3,441,959
TEXTURED PANEL AND PROCESS OF PRODUCING SAME
Filed June 5, 1961 Sheet 2 of 3
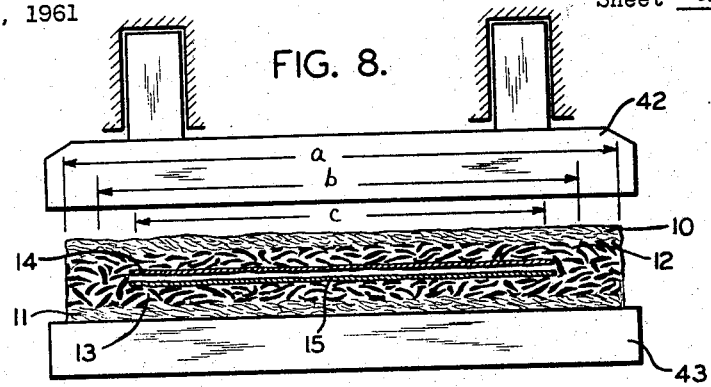
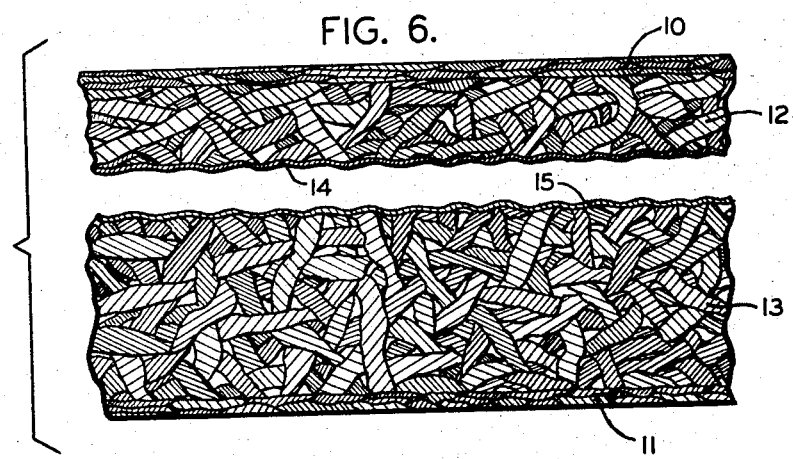
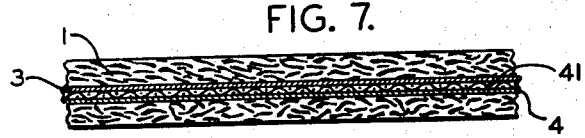
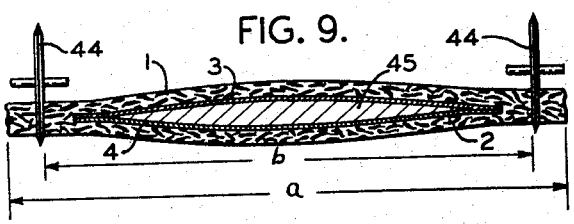
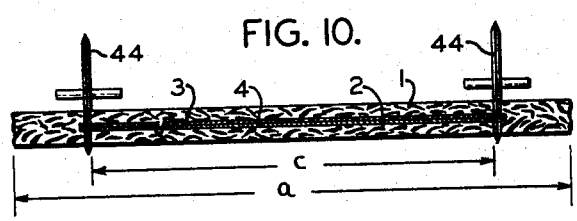
INVENTORS
WILLIAM D. MACDONALD
FREDERIC B. COMLOSSY
VERNON F. SEARS
BY
ATTORNEY.

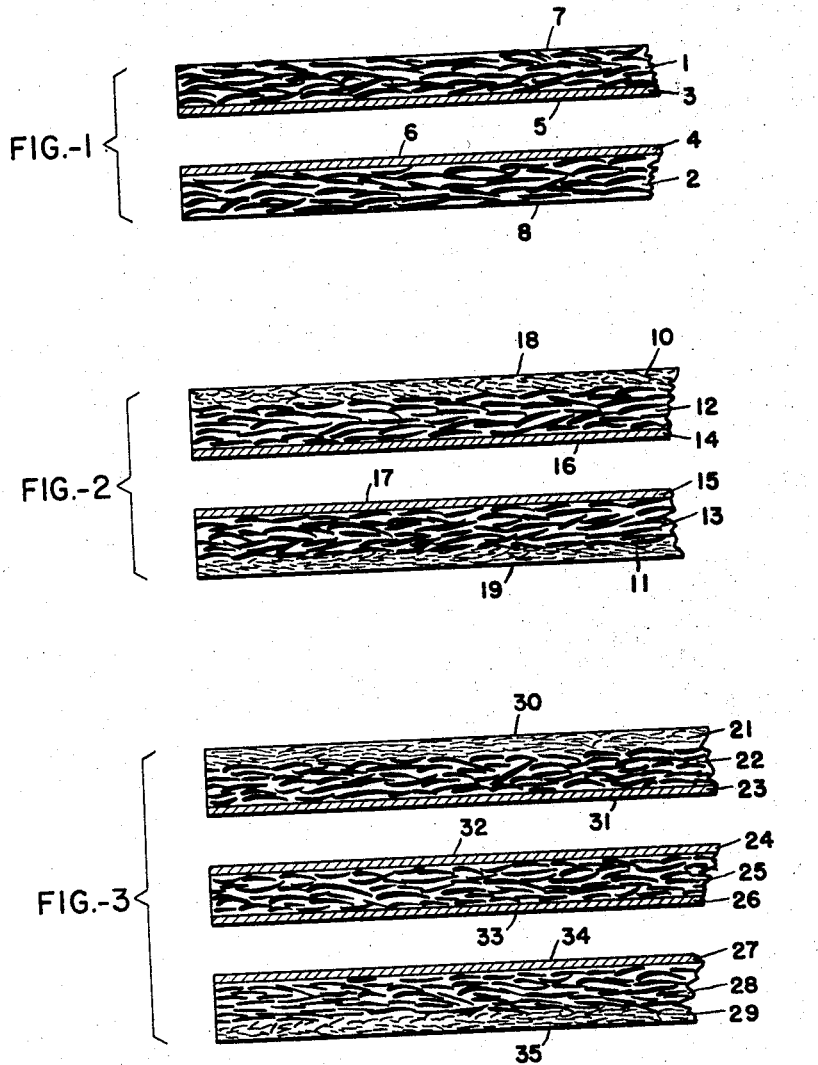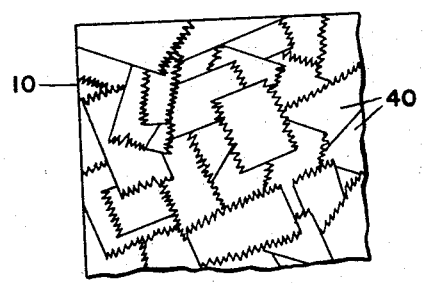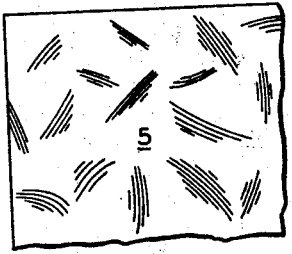

FIG. 12.

TRIMMED PANELS
ROUGH BLANK
SEPARATING SHEETS
46

FIG. 11.

SEPARATING SHEETS
ROUGH BLANK
TRIMMED PANEL
47

INVENTORS
WILLIAM D. MACDONALD
FREDERIC B. COMLOSSY
VERNON F. SEARS

BY James M. Heitman

ATTORNEY.

3,441,959

TEXTURED PANEL AND PROCESS OF PRODUCING SAME

Vernon F. Sears, Pelham Manor, and William D. MacDonald, White Plains, N.Y., and Frederic B. Comlossy, South Bend, Ind., assignors to U.S. Plywood Champion Papers, Inc., a corporation of New York
Filed June 5, 1961, Ser. No. 114,828
Int. Cl. B32b 3/26, 21/02, 21/06
U.S. Cl. 161—161     8 Claims The present invention relates to an improved lightweight particle board and the method for its manufacture. Broadly, the invention is concerned with a unique panel which is characterized by having one face comprising wood and a second face comprising a membrane as, for example, paper. The invention is more particularly concerned with an inexpensive lightweight panel having a unique textured side and a plane side having a beautiful vignetted surface. In its more specific adaptation, the present invention is concerned with an improved technique for manufacturing these lightweight particle board panels in a very efficient and inexpensive manner. The panels of the present invention have a finished textured appearance on one side and a plane other side, preferably a surface of fine, large area shavings. This permits flexibility in use in construction of these panels which multi-purpose is extremely desirable and very economical.

In one broad concept of the present invention, these panels are produced by placing a uniform layer of wood chips or flakes on a suitable base such as a caul plate or belt. Layers of paper or plastic or other types of membranes are then positioned on top of the mat of wood. A second or top layer of wood chips or flakes are then placed uniformly on the membranes or papers and the panel treated by conventional techniques to produce at least two particle panels.

It is well known in the art to prepare particle board panels by various processes. It is also known that there exists a great market demand for a lightweight particle board panel having aesthetic characteristics, high durability, and flexibility in its use. These inexpensive, but strong lightweight panels are in very heavy demand for many industrial uses as, for example, for use as ceiling panels in mobile home and travel trailer industry and in the general construction field. In accordance with the present invention, these panels are manufactured by a unique and economical technique which produces generally at least two similar panels of the same or different thicknesses, each of which has on one side a pleasing textured core to which a plain facing paper is bonded thereby itself becoming textured, and on the other side a conventional shaving or flake face. If desired, the paper face may be removed by mechanical or chemical means but this would be unusual. On the other hand, the textured effect may be accentuated by a paint roller or a paint sprayed at an acute angle to the surface of the board.

The present invention may be readily understood by reference to the drawings illustrating embodiments of the same.

FIGURE 1 illustrates, in exploded exaggerated form, two similar panels as they emerge from the hot or cold press, while FIGURE 2 illustrates, in exploded form, two different types of similar panels as they emerge from the press.

FIGURE 3 illustrates, again in exploded condition, the structure wherein two similar panels are manufactured along with an intermediate panel of a different type.

FIGURE 4 shows the vignetted face of shavings and preferably forming the rear face, while FIGURE 5 shows the decorative textured face and preferably forming the outer or front face.

FIGURE 6 is a detailed enlarged, exploded view of two shaving faced, wood particle boards shown in FIGURE 2, but with the textured core and plain, undecorated, facing paper bonded thereto being exaggerated and with the two boards being of different thicknesses, such as, ⅜″ and ¾″.

FIGURE 7 illustrates an interposed wire screen or embossing plate 41 textured, either similarly or differently, on each side to increase the natural textured face imparted to the paper face by the rough, uneven, unoriented particles.

FIGURES 8, 9, and 10 show the steps in manufacturing either two textured panels or a double convex panel suitable for wall or partition or door use.

FIGURE 8 shows conventional hot press platens 42 and 43 with the width of the rough blank or mat being indicated by a, the width of two separate panels being indicated by c after being trimmed to the proper dimensions by trim saws 44 in FIGURE 10.

FIGURE 9 illustrates the panel trimmed by trim saws 44 to width b so as to be glue stitched at the longitudinal edges and subsequently having a spreader block 45 inserted between the unbonded sections. The spreader blocks may be of any shape or dimensions as, for example, wedge-shaped, 18″ to 36″ long by 1″ to 6″ wide by 1″ to 4″ thick, one inserted from each end, or one long rod or bar (1″ x 1″ to 4″ x 4″) throughout the length of the panel, or two short rods or bars inserted from each end.

FIGURE 10 shows the panel trimmed to width c and thereby forming two separate textured panels.

FIGURE 11 and FIGURE 12 illustrate a different method of manufacture, in which FIGURE 11 shows separating sheets 47 which extend over the sides of the rough mat and trimmed blank in only the longitudinal direction (to form a convex panel), while separating sheets 46 in FIGURE 12 extend beyond the mat on all four sides (thereby forming two separate and distinct panels).

Referring specifically to FIGURE 1, numerals 1 and 2 designate a homogeneous board formed preferably of large size, rough, unoriented wood chips or particles suitably bonded by glue and other adhesives in a manner to produce particle boards. Numerals 1 and 2 could, if desired, also be formed of shavings or flakes. Numerals 3 and 4 designate plies or layers of paper, fabric, glass fibers, plastic or other types of plane surfaced membranes which are permanently adhered throughout their areas to the rough surface layers of wood chips (or flakes) 1 and 2, respectively, after which the layers of paper are characterized by having textured surfaces 5 and 6, which may be designated as rear faces. Plies 1 and 2 preferably have plane faces 7 and 8 respectively which may be of any type or style. For example, they may be of a vignetted style comprising wood shavings of relatively large surface areas. These surface areas may be designated as the front surfaces.

Referring specifically to FIGURE 2, these particular types or styles of dual particle panels as they emerge from the manufacturing operation comprise relatively thin front surface plies 10 and 11 which are preferably of fine flaked wood or fine wood shavings of very thin thickness or other fine wood particles, but of substantial surface area and a suitable adhesive composition. Plies 10 and 11 have plane surfaces 18 and 19 respectively, which may be similar to the plane surfaces described with respect to FIGURE 1. These particular panels also comprise inner cores or plies 12 and 13 which plies are relatively thick and are of rough wood particles having glue or other suitable adhesive applied thereto. In accordance with the present invention, these panels also comprise plies 14 and 15 which are of decorative paper, plastic sheets or other equivalent membranes. These plies 14 and 15 have textured and pleasing decorative faces 16 and 17. Obviously, the respective plies such as 10, 12, and 14 as well as plies 15, 13, and 11 are rigidly and permanently adhered one to the other and form integral units.

Another more specific adaptation of the present invention is illustrated in FIGURE 3 wherein three unique panels are produced by the manufacturing technique of the present invention. Referring specifically to FIGURE 3, the top panel has a relatively thin surface ply 21, an intermediate ply 22, and a lower ply 23. Ply 21 may be similar to ply 10 of FIGURE 2, while plies 22 and 23 may be similar to plies 12 and 14 of FIGURE 2. Surface 30 of ply 21 may be similar to surface 18 of ply 10, and surface 31 of ply 23 similar to surface 16 of ply 14. The lower panel of FIGURE 3 comprising plies 27, 28, and 29 may be entirely similar to plies 21, 22, and 23, and surface 34 similar to surface 31 and surface 35 similar to surface 30.

The intermediate panel comprising plies 24, 25, and 26 may be of a different structure wherein ply 25 is similar to core 22 and wherein plies 24 and 26 are similar to plies 23 and 27. Surfaces 32 and 33 may be similar to surfaces 31 and 34.

While the foregoing has been described with respect to particular types of surface plies and core plies, it is to be understood that the exact compositions used in the respective plies may be varied appreciably and that, as pointed out heretofore, the present invention is concerned with unique panels at least one side of which comprises a textured side and the other side comprises a plane surface. It is evident that the intermediate panel illustrated in FIGURE 3 will comprise two textured surfaces 24 and 26.

With respect to FIGURES 1, 2, and 3, it is evident that no adhesion is secured between plies 3 and 4, between plies 14 and 15, between plies 23 and 24, and between plies 26 and 27. In effect, having no adhesion between the respective textured sides, these textured sides function as release sheets so as to secure rapid and efficient separation of the panels.

Reference is made to FIGURE 4 which illustrates a preferred plane surface of the present invention, such as ply 10 of FIGURE 2 comprising a vignetted surface of wood shavings 30 of large surface area. FIGURE 5 is a view of the textured surface as, for example, surface 14 of FIGURE 2.

As pointed out heretofore, the present invention is broadly concerned with a unique type of particle board panel and the method of manufacturing the same. The panel, in essence, comprises a particle panel of wood chips or shavings having a plane side and a textured or decorative side secured by adhering paper, cloth or other suitable type of membrane thereto. The panel may be manufactured utilizing techniques of any particle board plant having facilities to spread a layer of wood chips or flakes on a suitable support such as a caul plate or belt, then placing layers of paper thereon and then placing on top of the paper a second layer of wood chips or flakes followed by processing the panel by known techniques in the manufacture of particle boards. The gluing or adhering materials used may comprise conventional glues, as well as thermosetting urea formaldehyde or phenol formaldehyde formulations. Rubber latexes may also be used as taught in the art.

A specific adaptation of the present invention is to prepare particle boards as described in U.S. Patent 2,642,371 issued June 16, 1953 entitled "Composite Wooden Board," Inventor: F. Fahrni, and in U.S. Patent 2,686,143 issued Aug. 10, 1954 entitled "Process for Manufacturing a Composite Wooden Board," Inventor: F. Fahrni, and sold in the United States under the trademark "Novoply."

In accordance with the present invention, the separator sheets forming the textured ply may be paper, plastic, cloth, Fiberglas, aluminum, transparent membranes or other equivalent materials. These are placed in the center so as to produce two panels. It is to be emphasized that the separator sheets may also be used advantageously in the center of a homogenous particle board as distinguished from "Novoply," the sole requirement being that it be positioned so as to give each particle board one textured surface. A particular advantage of aluminum foil for use as the textured ply is that it will impart insulation characteristics to the panel. It is within the concept of the present invention to use fireproof and non-combustible membranes such as membranes comprising asebestos and Fiberglas as the textured ply.

Also, as mentioned heretofore, it is apparent that in the process of manufacturing the particle boards of the present invention, no adhesion is secured between the respective papers forming the textured surfaces as to permit ready separation of the panels as they emerge from the processing operation. Thus, textured plies 14 and 15 of FIGURE 2 are rigidly and permanently attached to plies 12 and 13 respectively, but no adhesion exists between plies 14 and 15. Likewise, with respect to FIGURE 1, rigid adhesion of plies 3 and 4 is secured to plies 1 and 2 but no adhesion exists between plies 3 and 4, thereby permitting ready separation of the finished panels.

Also, the textured surfaces may be embossed to produce decorative and beautiful effects by known techniques. A preferred method of producing these panels is to emboss the same using various colors and various designs. This may be secured by inserting between the layers of paper or membrane as they are being manufactured, dies of various designs which will produce the desired embossing effects on the textured surface.

In order to further illustrate the invention, one specific method of manufacturing the panels is as follows: A heavy deckle frame or equivalent structure of the desired measurement is placed on top of a support or caul plate. The deckle frame, which acts as a side mold during the panel forming stages, and the caul plate travel together around a forming line during which time the desired combination of wood, glue, and paper are spread upon the caul plate.

The caul plate first passes beneath a material spreader which uniformly spreads a mixture of wood shavings, water, and glue upon the caul plate. This constitutes the front ply of a first panel as, for example, ply 11 of FIGURE 2. The panel then moves on passing beneath core material spreaders which spread a desired mixture of core wood, water, and glue. This constitutes the core ply of the first panel as, for example, ply 13 of FIGURE 2.

At the next station, paper is placed upon the core ply. As pointed out heretofore, instead of paper, any suitable membrane such as a lucid, non-transparent or transparent plastic may be utilized. Also, other materials such as cloth, Fiberglas, and aluminum foil may be used. If insulating characteristics are desired, aluminum foil and membranes comprising asbestos are desirable.

If paper is used, a satisfactory paper for example may be a 25 pound greaseproof which will bond to the glue mixture which coats the wood particles, yet will prevent penetration of this glue through the paper. The type of paper used, however, may be varied appreciably and is of a size so as to be co-extensive with the core ply.

Two sheets of the paper or equivalent are utilized which, for example, constitute the textured ply 14 of the top panel of FIGURE 2 and textured ply 15 of the lower panel as illustrated in FIGURE 2. Permanent bonding is secured between plies 10, 12, and 14, but obviously no bonding between plies 14 and 15 which plies constitute the inserted paper or other membrane.

Under certain circumstances, it is desired to emboss the textured plies as, for example, 14 and 15 and, under these conditions, a die of the desired design is positioned between sheets of paper.

In accordance with the specific adaptation being described, the panel then moves on, passing beneath a spreader which spreads core material identical to the first core material spread and which constitutes ply 12 of FIGURE 2. The panel then passes under a texture material spreader to receive the last spread ply 10 of FIGURE 2 and which is identical to the first spread ply 11 of the upper panel. The panels now move into a prepress for a satisfactory time period. This gives stability to the panels so that they will retain their form during entry into the hot press. The panels are held down so the deckle frame or equivalent may be removed without damaging the edges of the panels. After prepressing, the panels move into the hot press charger. In the hot press, the panels are further compressed and cured under a maximum pressure at elevated temperatures. After completing the press cycle, the hot press opens and the panels and caul plates are withdrawn. The panels are removed from the caul plates and are cooled for further processing. The panel boards are removed from the outlet end of the cooler with a fork truck to a storage area and held until they receive their next processing which is cutting to size. The panels are fed into a saw which trims them to the desired size.

Thus, the present invention is concerned with a unique plywood panel which has great flexibility for use in all types of construction and the method for its preparation. The panel is generally characterized by having one face comprising wood and a second face comprising a membrane. The wood face is preferably a plane surface of a vignetted style, while the membrane face is preferably of a rough textured style. Thus, the panels permit great flexibility in use and, at the same time, render pleasing aesthetic effects.

What is claimed is:
1. Method of manufacturing pressed boards comprising the steps of:
   (1) depositing wood particles containing a thermo-hardening bonding means on a supporting surface,
   (2) interposing two sheets of plain paper having no adhesive independently applied thereto, between and within the layer of particles in such a manner that two parallel edges of each sheet are spaced inwardly from the corresponding edges of said wood particle layer,
   (3) applying heat and pressure by pressing said assembly of particles and sheets between heated platens of a press until the bonding means has set and the sheets have adhered only to the particles and the particles are continuously bonded together at the two edges to form a rough mat blank,
   (4) removing the edges by squaring off,
   (5) separating the rough mat blanks in the area of the sheets into two pressed boards.

2. Process for the production of pressed plates from mat blanks of wood particles comprising the steps of:
   (1) applying a thermosetting binder to said wood particles and subsequently piling the wood particles, characterized in that two blanks are put one above the other,
   (2) interposing two flexible paper sheets which do not stick together under the effect of heat and pressure, the length of said sheets being smaller than the corresponding edge dimensions of the blanks and being so inserted between the blanks that these blanks combine during the pressing to form two plates joined at least along two parallel edges,
   (3) applying heat and pressure by pressing the blanks between two heated plates of a press until the binder has hardened and the sheets stick to the blanks formed into plates,
   (4) separating the superposed blanks in the range of the sheets after the pressing is completed to obtain the pressed plates.

3. Process according to claim 2, characterized in that the two edges along which two blanks combine during the pressing are separated by severing adjacent the border so that the superposed plates can be separated from each other to form unattached plates.

4. Process according to claim 2, characterized in that, in order to obtain curved profiled plates, a wedge-shaped insert is driven between the two plates formed from the blanks after the pressing.

5. A lignocellulosic product comprising a thick core of relatively heavy and thick wood particles having air spaces therein for escape of moisture while being bonded together and to provide for insulation during use, faces on each side of said core comprising a thin layer of wood shavings placed in a longitudinal direction, each wood shaving being fine and thin and of substantial area so as to produce a vignetted overlapping pattern, a resinous adhesive applied to said wood core particles and to said wood shavings, two membrane sheets in contact with each other; placed within said core both sheets in contact with the thick wood particles and parallel to said face shavings, said membrane sheets having no adhesive on their adjacent sides.

6. A lignocellulosic product as set forth in claim 5 wherein both membrane sheets are entirely free of adhesive on all sides and are bonded to the wood particles solely by the resin coated on the particles.

7. A lignocellulosic product as set forth in claim 6 wherein the membranes extend throughout the area of the core in at least one direction, and, at least, partially separate the core.

8. A lignocellulosic product as set forth in claim 7 wherein the membranes extend throughout the area of the core in a longitudinal direction only, and is short of each side edge of the core whereby the board may be bowed between membranes to form a convex panel.

References Cited

UNITED STATES PATENTS

| | | | |
|---|---|---|---|
| 2,642,371 | 6/1953 | Fahrni | 154—45.9 |
| 2,773,790 | 12/1956 | Clark | 154—45.9 |
| 2,442,422 | 6/1948 | Loetscher | 156—288 |
| 3,020,191 | 2/1962 | Meek et al. | 156—288 |
| 2,268,673 | 1/1942 | Reynolds. | |
| 1,398,142 | 11/1921 | Novotny. | |
| 2,431,720 | 12/1947 | Willey | 161—219 |
| 3,140,516 | 7/1964 | Stack | 161—62.2 |

FOREIGN PATENTS 585,620 10/1959 Canada.
644,564 10/1950 Great Britain.

ROBERT F. BURNETT, *Primary Examiner.*

W. J. VAN BALEN, *Assistant Examiner.*

U.S. Cl. X.R.

156—62.2, 288, 289; 161—160, 162, 165, 166, 200, 220, 268

U.S. DEPARTMENT OF COMMERCE

PATENT OFFICE

Washington, D.C. 20231

UNITED STATES PATENT OFFICE
CERTIFICATE OF CORRECTION

Patent No. 3,441,959                                             April 29, 1969

Vernon F. Sears et al.

It is certified that error appears in the above identified patent and that said Letters Patent are hereby corrected as shown below:

In the heading to the printed specification, lines 6 and 7 "assignors to U. S. Plywood Champion Papers, Inc." should read -- assignors to U. S. Plywood-Champion Papers Inc. --.

Signed and sealed this 5th day of May 1970.

(SEAL)
Attest:

Edward M. Fletcher, Jr.                              WILLIAM E. SCHUYLER, JR.
Attesting Officer                                            Commissioner of Patents